(12) United States Patent
Bianco et al.

(10) Patent No.: US 8,781,695 B2
(45) Date of Patent: Jul. 15, 2014

(54) METHOD AND APPARATUS FOR CONTROLLING PICKUP ON UPHILL FOR A MOTOR-VEHICLE PROVIDED WITH AN AUTOMATIC OR ROBOTIZED GEARBOX

(75) Inventors: Andrea Bianco, Turin (IT); Claudio Cervone, Turin (IT); Giuseppe Gatti, Turin (IT); Giuseppe Lorusso, Turin (IT); Euplio Pagliarulo, Turin (IT); Francesco Cimmino, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 951 days.

(21) Appl. No.: 12/329,008

(22) Filed: Dec. 5, 2008

(65) Prior Publication Data
US 2009/0198424 A1 Aug. 6, 2009

(30) Foreign Application Priority Data
Feb. 1, 2008 (EP) .................................... 08425062

(51) Int. Cl.
*F16H 61/00* (2006.01)
(52) U.S. Cl.
USPC .............. 701/51; 701/65; 701/67; 180/338; 477/34; 477/70; 477/73; 477/80; 477/83; 477/97; 477/114; 477/120; 477/166; 477/174
(58) Field of Classification Search
CPC ................................................. Y10S 477/90
USPC ........ 701/65, 51, 69, 89, 67, 82, 90; 180/337; 180/338; 477/34, 70, 73, 80, 83, 90, 91, 97, 477/114, 120, 166, 174
See application file for complete search history.

(56) References Cited

U.S. PATENT DOCUMENTS

| | | | | |
|---|---|---|---|---|
| 5,484,350 A | * | 1/1996 | Ishikawa et al. | 477/97 |
| 6,383,117 B1 | | 5/2002 | Lee | |
| 6,549,840 B1 | * | 4/2003 | Mikami et al. | 701/69 |
| 2004/0249542 A1 | * | 12/2004 | Murasugi et al. | 701/51 |
| 2005/0085950 A1 | * | 4/2005 | Altenkirch | 701/1 |

FOREIGN PATENT DOCUMENTS

| | | |
|---|---|---|
| DE | 44 40 706 | 5/1996 |
| EP | 0 812 747 | 12/1997 |
| JP | 6-74320 A | 3/1994 |
| JP | 7-71588 A | 3/1995 |
| JP | 2004-347062 A | 12/2004 |
| JP | 2007-271282 A | 10/2007 |

OTHER PUBLICATIONS

English translation of Japanese Patent Office Action issued Dec. 25, 2012, in connection with Japanese Patent Application No. 2009-021599.
European Search Report for 08425062 mailed, Jul. 7, 2008.

* cited by examiner

*Primary Examiner* — Adam Tissot
(74) *Attorney, Agent, or Firm* — Nixon & Vanderhye P.C.

(57) ABSTRACT

A method and apparatus to control the pickup on an uphill slope of an automotive vehicle provided with an automatic or robotized gearbox provide the definition of a control strategy of the gear box operation, also according to the gradient of the uphill slope, which is preferably calculated based on a longitudinal acceleration value of the automotive vehicle, and based on the altitude at which the automotive vehicle can be found, which is preferably calculated based on a detected atmospheric pressure value. In this way, it is also possible to consider the reduction in the engine torque due to the reduction in the air density with altitude.

2 Claims, 6 Drawing Sheets

METHOD AND APPARATUS FOR CONTROLLING PICKUP ON UPHILL FOR A MOTOR-VEHICLE PROVIDED WITH AN AUTOMATIC OR ROBOTIZED GEARBOX

This application claims priority to European Application No. 08425062.0, filed 1 Feb. 2008 the entire contents of which are hereby incorporated by reference.

BACKGROUND OF THE INVENTION

The present invention relates to a method and apparatus to control the pickup (acceleration at start) on an uphill slope of an automotive vehicle provided with an automatic or robotised gearbox.

One of the main problems encountered in vehicles provided with automatic transmissions is the need to adapt the vehicle's behaviour to the driver's needs and requirements, which normally implies the capability to understand and anticipate the driver's intentions. In the case of the pickup of an automotive vehicle on an uphill slope, an automatic gearbox of the conventional type is not controlled any differently compared to normal movement on horizontal ground, whereby the friction clutch that connects the engine to the driving wheels is engaged at the same speed as the engine hence this takes place during horizontal movement, only according to the accelerator pedal. This causes anomalous and uncomfortable behaviour of the automotive vehicle, as well as implying the risk of undesired slipping in the clutch and consequent damage to it. Such a situation is not found in the case of an automotive vehicle with a manual gearbox, since in such a case it is the driver who, for pickup from a stationary position on an uphill slope, recognises the different operating condition and anticipates the clutch manoeuvre modulating the accelerator and clutch pedals better.

In order to solve the aforementioned problem, the possibility to automatically recognise the condition of pickup on an uphill slope could be considered, measuring the time that elapses between the moment in which the driver keeps the brake pedal pressed and the moment in which he/she presses the accelerator pedal. In particular, it could be considered that a lower value of the aforementioned interval of time than a pre-determined threshold value is indicative of the presence of a condition of pickup on an uphill slope. Such an approach is however limiting, since it is not able to modulate the intervention according to the actual operating conditions and since it then requires the complication of excluding an intervention of this type in the case of pickup on horizontal ground.

SUMMARY OF THE INVENTION

The object of the present invention is to solve the aforementioned problem simply and efficiently.

In view of reaching this object, the invention relates to a method to control the pickup on an uphill slope of an automotive vehicle provided with an automatic or robotised gearbox, wherein an electronic means is provided for defining a control strategy of the gearbox operations according to the engine speed, characterised in that the aforementioned control strategy is also defined according to the gradient of the uphill slope. Furthermore, the method according to the invention is preferably characterised in that the aforementioned control strategy is also defined according to the altitude at which the automotive vehicle can be found.

The object of the invention is also the apparatus for implementing the aforementioned method.

BRIEF DESCRIPTION OF THE DRAWINGS

Further characteristics and advantages of the invention will be clear from the following description with reference to the attached drawings, given by way of a non-limitative example, in which.

DETAILED DESCRIPTION OF THE INVENTION

Figure 1:
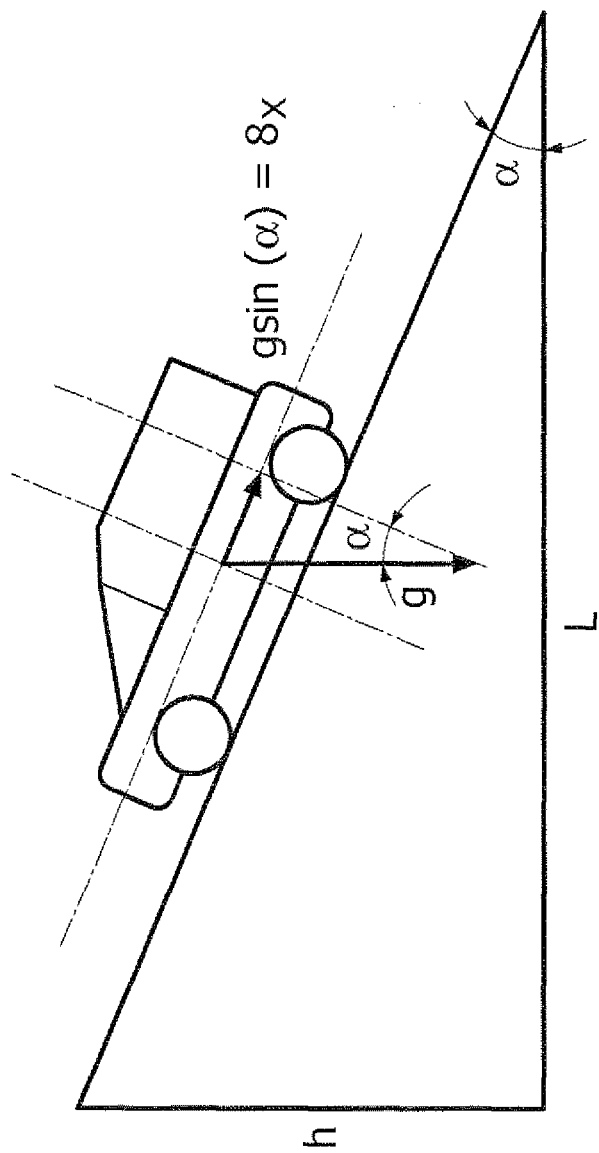
FIG. 1 is a schematic view showing an automotive vehicle during pickup on an uphill slope.

A first important feature of the invention lies in the fact that the operation of the automatic or robotised gearbox during the pickup of the automotive vehicle on an uphill slope is also controlled according to the gradient of the uphill slope. According to a further preferred feature of the invention, the gradient of the uphill slope is calculated based on the detected acceleration value of the automotive vehicle in its longitudinal direction, along the uphill slope. The arrangement of a longitudinal accelerator sensor means of the automotive vehicle is often provided on the automotive vehicle, for various purposes. According to the invention, the angle $\alpha$ indicating the gradient of the uphill slope is calculated as follows:

$$\alpha = \arcsin\left(\frac{a_x}{g}\right) \quad (1)$$

wherein $\alpha_x$ is the linear acceleration value detected by the aforementioned sensor means. Based on the value of $\alpha$ the gradient of the uphill slope is calculated as a percentage as follows:

$$\text{Gradient } \% = 100 * \frac{h}{L} = 100 * \tan(\alpha) \quad (2)$$

This value is used as input data in the model that determines the intervention in the control strategy of the gear box in order to consider the operating conditions of pickup on an uphill slope.

It is important to observe that the value of $\alpha_x$ is equal to $g \cdot \sin(\alpha)$ only when there is no other contribution to the linear acceleration, which means that the automotive vehicle is carrying out a pickup on an uphill slope from a stationary position.

It is possible, however, to calculate the value of the gradient of the road also in moving conditions by subtracting the inertial values deriving from the dynamics of the vehicle from $\alpha_x$. In this way, it is possible to calculate the gradient of the road dynamically according to relationship (2) the angle $\alpha$ being calculated appropriately according to relationship (1) whose acceleration value will be the constant contribution equal to $g \sin(\alpha)$.

According to a further important and preferred characteristic of the invention, the control strategy of the gear box during pickup on an uphill slope is determined, also taking into consideration the geographical altitude at which the automotive vehicle can be found, so as to consider the fact that the torque generated by the engine reduces with altitude due to the reduction in air density. According to the invention, the altitude value is calculated based on the Bernouilli equation:

$$p + \rho gh + \frac{1}{2}\rho v^2 = const \quad (3)$$

Applying the formula (3) in two points: the first at sea level and the other one at altitude h, the following is obtained:

$$p_h + \rho_h g \Delta h = p_0 \quad (4)$$

Wherein $p_0$ is the pressure at sea level, $p_h$ is the pressure at altitude h, $\rho_h$ is the air density, g is the acceleration due to gravity and $\Delta h = h-0 = h$ is the altitude in meters.

Extracting $\Delta h$ from the formula (4) the following is obtained:

$$\Delta h = \frac{p_0}{\rho_h g} - \frac{p_h}{\rho_h g} \quad (5)$$

replacing the standard value, the following relationship is obtained.

$$\Delta h = const_1 - const_2 * p_h \quad (6)$$

Also concerning the detection of the atmospheric pressure, modern automotive vehicles are often already provided with sensor means for such purpose, whereby the electronic control gear case with which the automotive vehicle is provided can provide an indicative signal of the atmospheric pressure detected.

According to the invention, an electronic control means is provided, able to carry out an algorithm determined for calculating the variation in the control maps of the operations of the gear box in order to obtain the engagement of the clutch at a higher engine speed. As shown in the schematic view in FIG. 2, the electronic control means is programmed to take into account the calculated gradient value and the atmospheric pressure value for defining a new control strategy causing a variation in the engine torque compared to that obtained in the case of pickup on horizontal ground. The control strategy is defined through an automaton based on the available information with the vehicle stationary, before the pickup manoeuvre is started.

Figure 2:
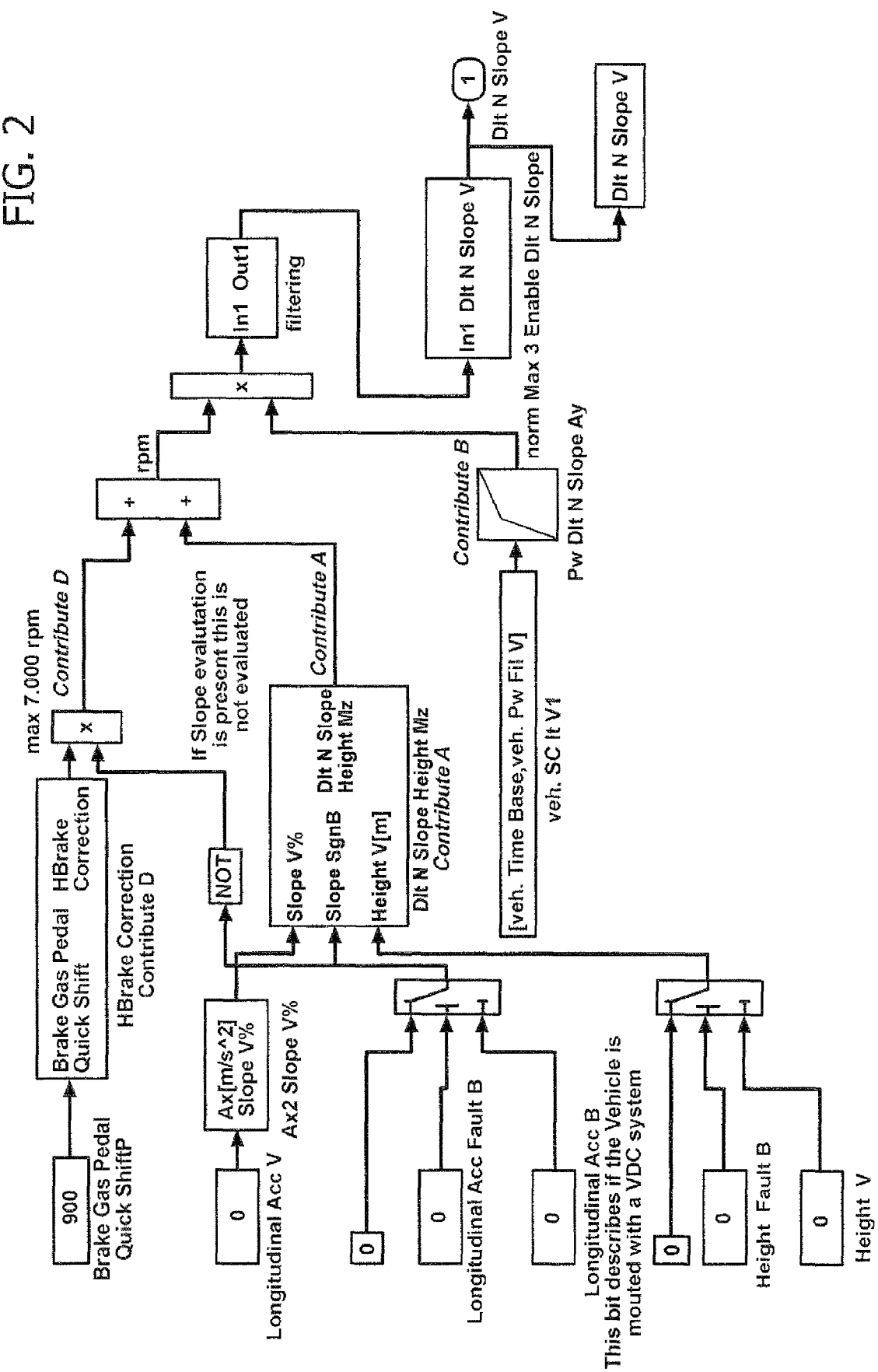
FIG. 2 is a schematic view showing the basic principle of the method and of the apparatus according to the invention.

Principally, the definition of the strategy consists of considering the gradient value as a percentage, and the altitude value at which the automotive vehicle can be found, in meters, and manipulating them in a specific block, as shown in FIG. 2, in order to obtain a determined increase in engine torque should a pickup be carried out on an uphill slope in a high gradient condition.

There are three fundamental contributions for calculating the optimal threshold for obtaining the increase in engine torque at pickup, respectively the value that can be determined from the basic strategy block considering the accelerator pedal and the brake pedal, the value deducible from the calculation block taking into account the altitude and gradient and a value that can be determined from the accelerator pedal weighing the previous two contributions.

Figure 3:
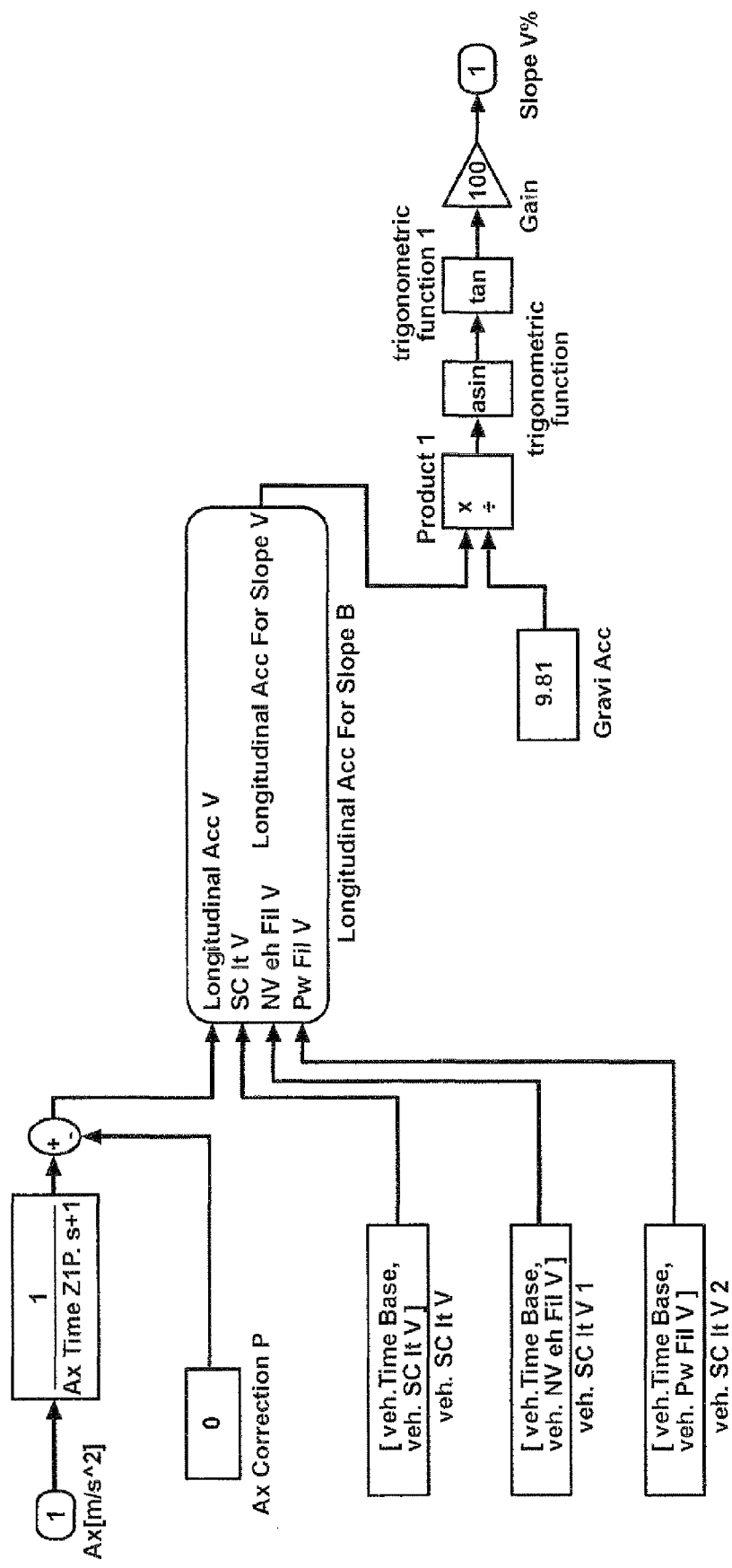
FIGS. 3 and 4 show two examples of blocks that can be used in the implementation of the method according to the invention.

In order to calculate the gradient as a percentage according to formula (2) the longitudinal acceleration is evaluated as shown in FIG. 3. Fundamentally, the acceleration value detected is sampled with reference to a stationary vehicle condition, when the acceleration of the vehicle is definitely 0 and an extra off-set potential correction is introduced.

Figure 4:
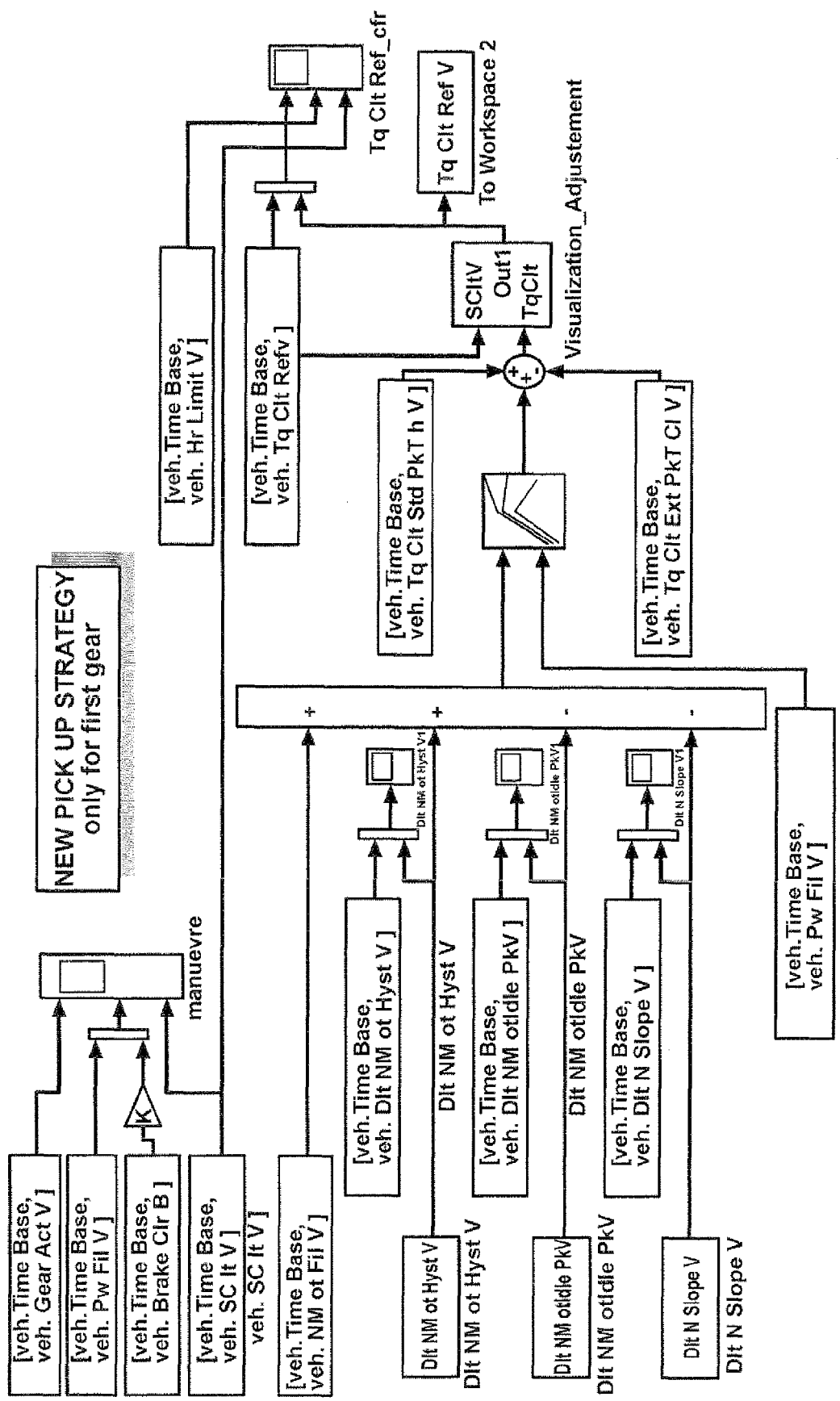

The various contributions of the strategy cause a pickup with a higher engine torque value (see FIG. 4). The result of the block shown in FIG. 4 is the achievement of a torque value with control of the clutch engagement.

The strategy also considers the condition in which the individual linear acceleration values or the atmospheric pressure values are not available; in such a circumstance the individual contribution deriving from the block is used as the recovery value, taking into account the accelerator pedal and the brake pedal (see FIG. 2), the latter being the only feasible contribution in such a circumstance.

Studies and experiences carried out by the Applicant have shown the advantages of the method according to the invention in terms of more correct and comfortable behaviour of the vehicle during pickup on an uphill slope.

Figure 5:
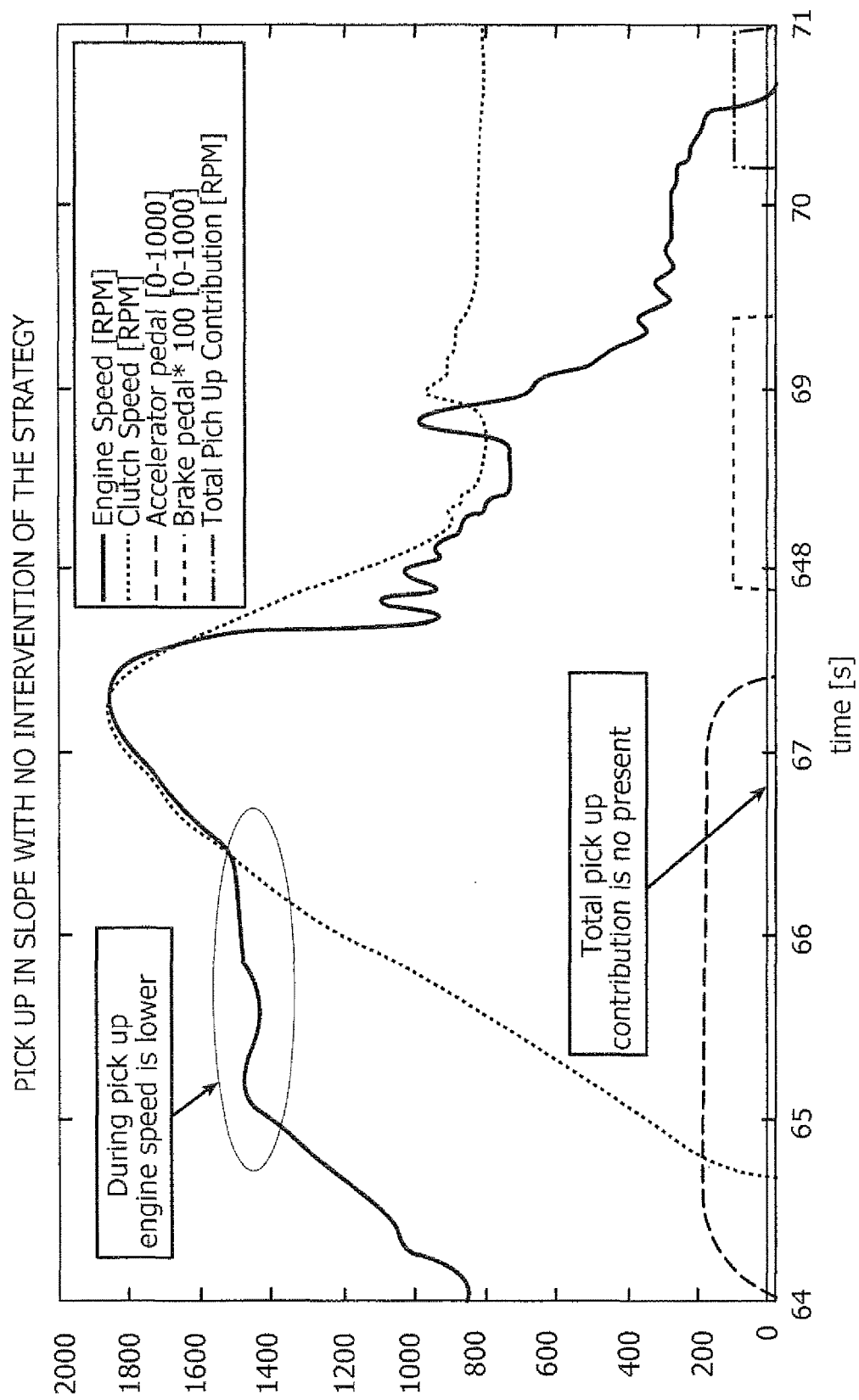
FIGS. 5 and 6 show two graphs showing the advantages of the invention.
Figure 6:
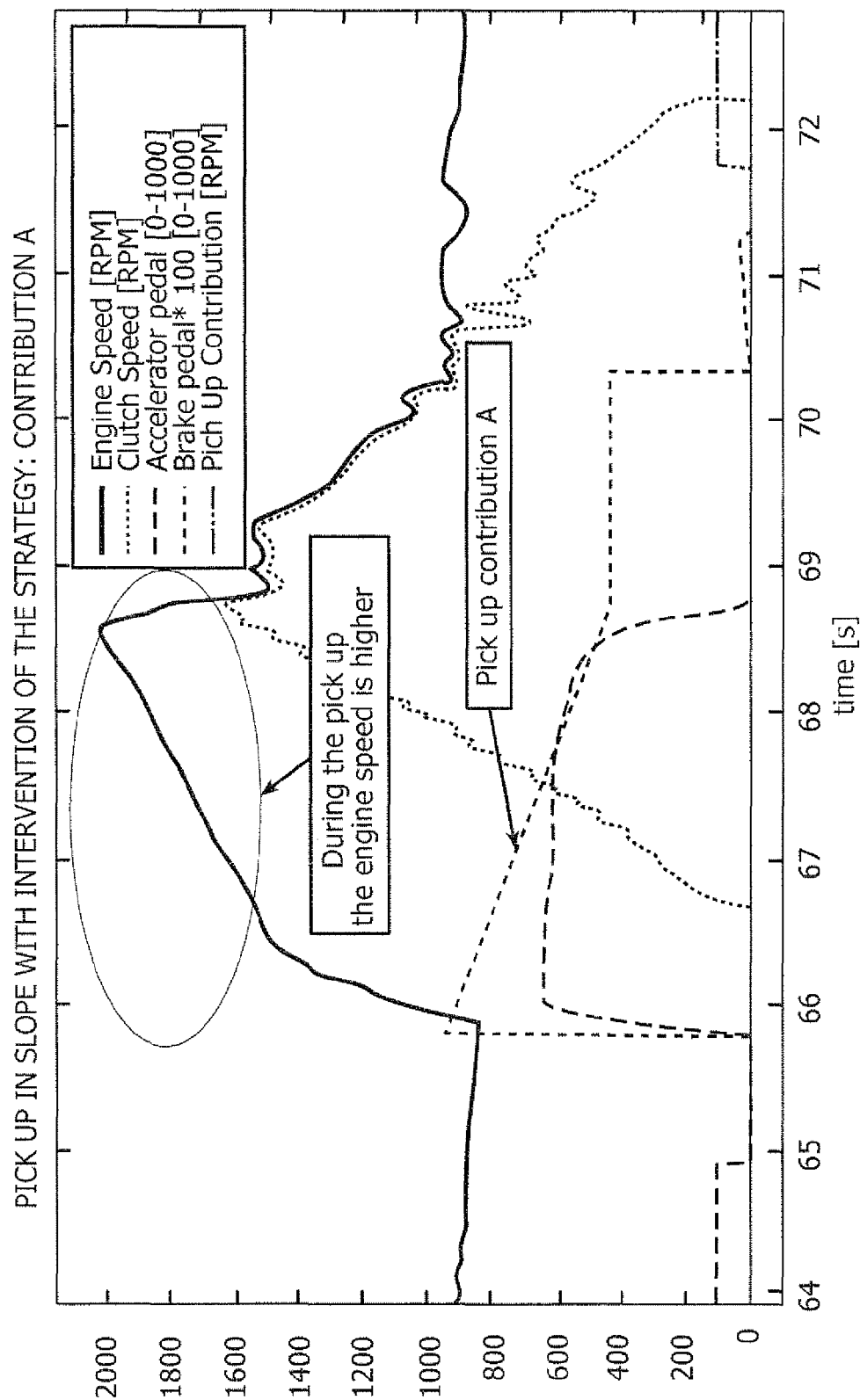

FIGS. 5 and 6 show the variations in the engine rotation speed, the clutch rotation speed, the position of the accelerator pedal, the position of the brake pedal, and the contribution of the control system of pickup on an uphill slope respectively in the case of lack of intervention of the strategy according to the invention (FIG. 5) and of intervention of such a strategy (FIG. 6). As can be seen, the intervention of the strategy according to the invention causes an increase in the engine rotation speed during the pickup manoeuvre which is a result of the specific operating conditions and, that is, as indicated above, of the gradient of the uphill slope and the altitude at which the automotive vehicle can be found.

Naturally, various modifications to the construction details and the embodiments can be possible, within the spirit of the invention according to that described and disclosed merely by way of example, without departing from the scope of the present invention.

What is claimed is:

1. A method to control a friction clutch of an automatic or robotised gear box of an automotive vehicle,
    wherein a gear box operating control strategy is defined according to an engine speed of the vehicle and a gradient angle of an uphill slope, the gradient angle of the uphill slope being calculated based on a detected acceleration value of the automotive vehicle in its longitudinal direction,
    wherein the gear box operating control strategy is defined with reference to an acceleration stage in which the automotive vehicle must start from a stationary condition on an uphill slope, in which the driver keeps the vehicle brake pedal pressed,
    wherein the gear box operating strategy in said acceleration stage is defined also as a function of a measurement of the time that elapses between the moment in which the driver keeps the brake pedal pressed and the moment in which the driver presses the vehicle accelerator pedal, and
    wherein the gear box operating control strategy is also defined according to an altitude at which the automotive vehicle is operating, calculated based on a detected value of the atmospheric pressure, and
    wherein a control unit controls the friction clutch of the automatic or robotized gear box by calculating an optimal threshold for obtaining an increase in engine torque at pickup, this calculation including a first contribution that is determined considering a shift time from the brake pedal to the accelerator pedal, a second contribution which takes into account the altitude and gradient angle of the uphill slope and a third contribution weighing the first contribution and the second contribution and based on a position of the accelerator pedal.

2. The method according to claim 1, wherein the gradient angle of the uphill slope is calculated as follows:

$$\alpha = \arcsin\left(\frac{a_x}{g}\right),$$

wherein $\alpha$ is the gradient angle of the uphill slope, $a_x$ is the detected acceleration value of the automotive vehicle in its longitudinal direction, and g is the acceleration due to gravity.

* * * * *